US011085518B2

(12) United States Patent
Balsiger et al.

(10) Patent No.: US 11,085,518 B2
(45) Date of Patent: Aug. 10, 2021

(54) INVERTED COMPOUND HARMONIC DRIVE

(71) Applicant: Hamilton Sundstrand Corporation, Charlotte, NC (US)

(72) Inventors: Derick S. Balsiger, Mayer, AZ (US); Keith Bloxham, Gilbert, AZ (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 189 days.

(21) Appl. No.: 16/388,603

(22) Filed: Apr. 18, 2019

(65) Prior Publication Data

US 2020/0332872 A1 Oct. 22, 2020

(51) Int. Cl.
*F16H 49/00* (2006.01)
*B64C 13/28* (2006.01)

(52) U.S. Cl.
CPC ........... *F16H 49/001* (2013.01); *B64C 13/28* (2013.01); *F16H 2049/003* (2013.01)

(58) Field of Classification Search
CPC ......................... F16H 49/001; F16H 2049/003
See application file for complete search history.

(56) References Cited

U.S. PATENT DOCUMENTS 5,061,227 A 10/1991 Fickelscher
9,394,984 B2 * 7/2016 Balsiger ................. H02K 7/116
9,751,617 B2 9/2017 Balsiger et al.
10,400,878 B2 * 9/2019 Balsiger .................. B64C 13/38
10,883,590 B2 * 1/2021 Balsiger ................. H02K 7/116
2015/0354686 A1 12/2015 Balsiger
2016/0245386 A1 * 8/2016 Rossberger ............ B62M 23/00
2017/0108107 A1 * 4/2017 Balsiger ................ F16H 49/001
2017/0197704 A1 * 7/2017 Balsiger ................. G01D 5/147
2018/0038467 A1 2/2018 Balsiger et al.
2018/0112760 A1 4/2018 Balsiger et al.
2019/0011032 A1 1/2019 Balsiger et al.
2021/0048095 A1 * 2/2021 Balsiger ................... H02K 7/08

FOREIGN PATENT DOCUMENTS

DE 29702710 U1 7/1998
EP 0589760 A1 3/1994
GB 920273 A 3/1963

OTHER PUBLICATIONS

Extended European Search Report; Application No. 192113201; dated Mar. 16, 2020; 8 pages.

* cited by examiner

*Primary Examiner* — Terence Boes
(74) *Attorney, Agent, or Firm* — Cantor Colburn LLP

(57) ABSTRACT

An inverted compound harmonic drive including: a wave generator configured to receive rotational input; a flex spline disposed radially within the wave generator that receives energy due to the rotation of the wave generator, the flex spline including a plurality of inner facing splines that include an axial center spline, a first axial end spline being adjacent to and forward of the axial center spline, and a second axial end spline adjacent to and aft of the axial center spline; an output gear meshes with the axial center spline; a first ground gear adjacent to and forward of the output gear that meshes with the first axial end spline; and a second ground gear adjacent to an aft of the output gear that meshes with the second axial end spline.

15 Claims, 6 Drawing Sheets

INVERTED COMPOUND HARMONIC DRIVE

BACKGROUND

Disclosure relates to reduction gears and more specifically to an inverted compound harmonic drive.

An aircraft utilizes a flight control system to control one or more movable control surfaces. For example, an aircraft may include a plurality of movable control surfaces located along or near the trailing edge of the wing, horizontal stabilizer and vertical stabilizer.

A typical flight control surface is controlled by one or more actuators.

One example of an actuator that can be used in a flight control system (FCS) is an electro-mechanical actuator (EMA). Aircraft manufacturers may eventually be able to replace all or part of the prior hydraulic systems that activate flight controls with lighter and simpler electrical systems. In such systems, rather than using hydraulics to generate power, electro-mechanical input may be provided to a compound harmonic drive that uses a gear reduction ratio to minimize system size.

BRIEF DESCRIPTION

Disclosed is an inverted compound harmonic drive comprising: a wave generator configured to receive rotational input; a flex spline disposed radially within the wave generator that receives energy due to the rotation of the wave generator, the flex spline including a plurality of inner facing splines that include an axial center spline, a first axial end spline being adjacent to and forward of the axial center spline, and a second axial end spline adjacent to and aft of the axial center spline; an output gear meshes with the axial center spline; a first ground gear adjacent to and forward of the output gear that meshes with the first axial end spline; and a second ground gear adjacent to and aft of the output gear that meshes with the second axial end spline.

In addition to one or more of the above disclosed elements the first axial end spline and the first ground gear have a first gear ratio; the second axial end spline and the second ground gear have a second gear ratio that is the same as the first gear ratio; and the axial center spline and the output gear have a third gear ratio that differs from the first and second gear ratios.

In addition to one or more of the above disclosed elements or as an alternate the first ground gear includes a first ground shaft extending in a forward direction; the second ground gear includes a second ground shaft extending in an aft direction; and the output gear includes an output shaft, the output shaft including one or more of: a first shaft portion extending in the forward direction with a first passage therethrough, the first passage being splined; and a second shaft portion extending in the aft direction with a second passage therethrough, the second passage being continuous with the first passage, the second passage being splined.

In addition to one or more of the above disclosed elements or as an alternate the first ground shaft has a third passage therethrough with a third passage diameter; the second ground shaft has a fourth passage therethrough with a fourth passage diameter; the first shaft portion of the output shaft extends through the third passage; and the second shaft portion of the output shaft extends through the fourth passage.

In addition to one or more of the above disclosed elements or as an alternate the first ground shaft and the second ground shaft each include a plurality of mounting holes.

In addition to one or more of the above disclosed elements or as an alternate the drive includes a first axial end bearing disposed between the first ground shaft and the wave generator; second axial end bearing disposed between the second ground shaft and the wave generator; and an axial center bearing disposed between the flex spline and the wave generator.

In addition to one or more of the above disclosed elements or as an alternate the first axial end bearing and the second axial end bearing are ball bearings; and the axial center bearing is a roller bearing, a ball bearing or a plain bearing.

In addition to one or more of the above disclosed elements or as an alternate the drive includes a first retaining ring disposed between the first axial end bearing and the axial center bearing and against the first axial end bearing; a first thrust washer disposed between the first axial end bearing and the axial center bearing and against the axial center bearing; a second retaining ring between the second axial end bearing and the axial center bearing and against the second axial end bearing; and a second thrust washer between the second axial end bearing and the axial center bearing and against the axial center bearing.

Further disclosed is an aircraft system comprising an inverted compound harmonic drive that includes one or more of the above disclosed elements. In addition to one or more of the above disclosed elements or as an alternate, the first ground shaft connects with an aircraft ground structure, and the second ground shaft connects with the aircraft ground structure, and the output shaft is configured to connect with a second aircraft component.

Disclosed is a method of transmitting energy from a first component to a second component, comprising: coupling an inverted compound harmonic drive to the first component, the second component, and a ground structure; transmitting energy from the first component to a wave generator of the inverted compound harmonic drive; transmitting energy from the wave generator to a flex spline of the inverted compound harmonic drive; and transmitting energy from the flex spline to an output gear that meshes with an axial center spline of the flex spline; a first ground gear is adjacent to and forward of the output gear that meshes with a first axial end spline of the flex spline; and a second ground gear is adjacent to and forward of the output gear that meshes with a second axial end spline of the flex spline; transmitting energy from the output gear through an output shaft to the second component.

In addition to one or more of the above disclosed elements or as an alternate the method includes coupling the output shaft to the second component with an output shaft spline.

In addition to one or more of the above disclosed elements or as an alternate the method includes securing a first ground shaft of the first ground gear that extends in a forward direction to a first structure; and securing a second ground shaft of the second ground gear that extends in an aft direction to a second structure.

In addition to one or more of the above disclosed elements or as an alternate the method includes rotatably connecting the second component to one of a first output shaft portion of the output shaft that extends in the forward direction through the first ground gear; and a second output shaft portion of the output shaft that extends in the aft direction through the second ground gear.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
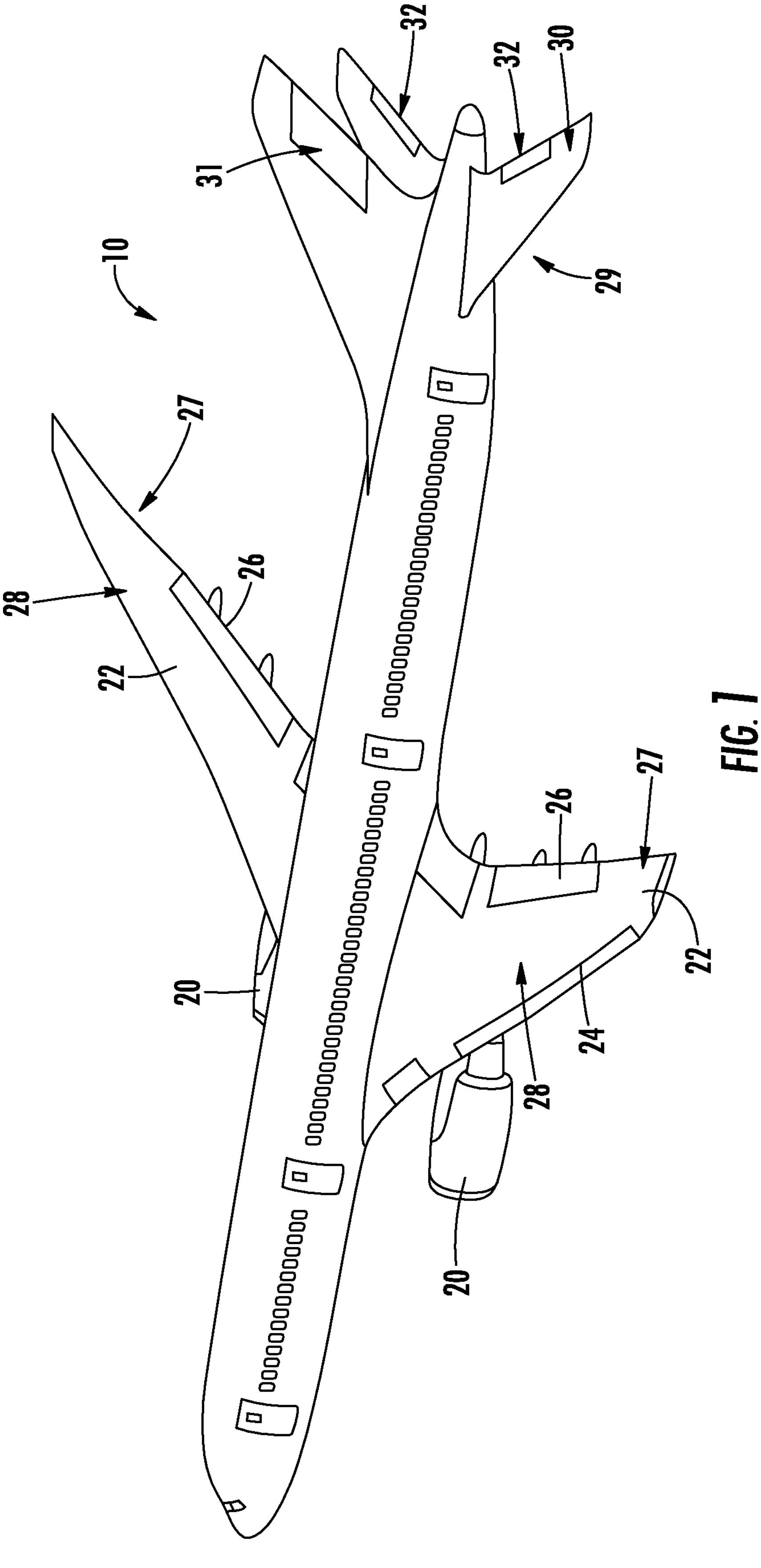
FIG. 1 is a perspective view of an aircraft that includes aerodynamic surfaces where embodiments of the present invention can be implemented.

FIG. 1 illustrates an example of a commercial aircraft 10 having aircraft engines surrounded by (or otherwise carried in) nacelles 20. The aircraft 10 includes two wings 22 that can each include one or more slats 24 and one or more flaps 26. The aircraft may further include ailerons 27, spoilers 28, trimmable horizontal stabilizer 30, one or more rudders 31, and elevators 32, each of which may be typically referred to as "control surfaces" as they are movable under aircraft power systems. As disclosed herein, these control surfaces are movable by actuators such as electromechanical actuators Electromechanical actuators (EMAs) are designed to be small and deliver a high power density. An inverted compound harmonic drive may be used in an EMA. When such drives are unbalanced, however, binding may be induced due to unbalanced reactionary forces within the gear. This binding reduces efficiency.

Figure 2:
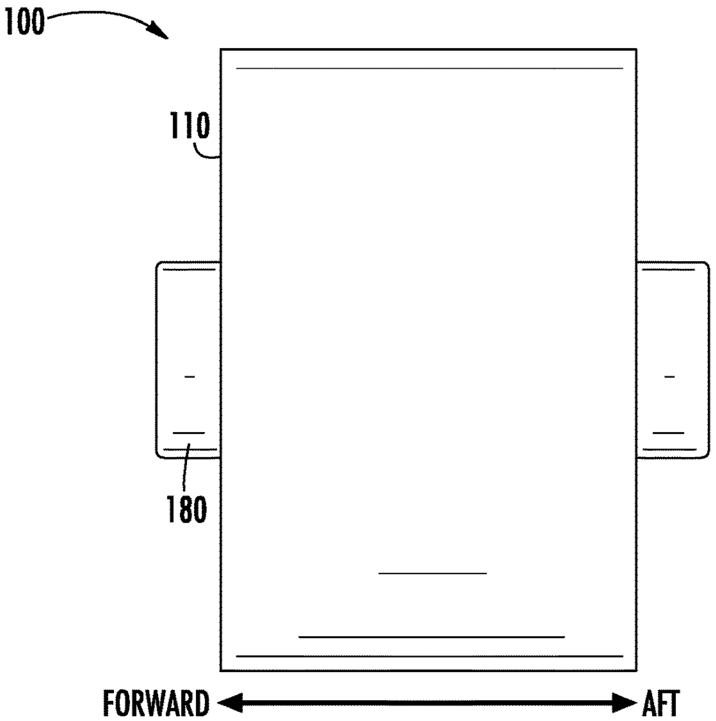
FIG. 2 is a side view of harmonic drive according to one embodiment.

FIG. 2 is a side view of an inverted compound harmonic drive 100 (drive 100) according to one embodiment. The drive 100 receives rotational energy at a wave generator 110 and transfers that energy to at least one output shaft 180.

Figure 3:
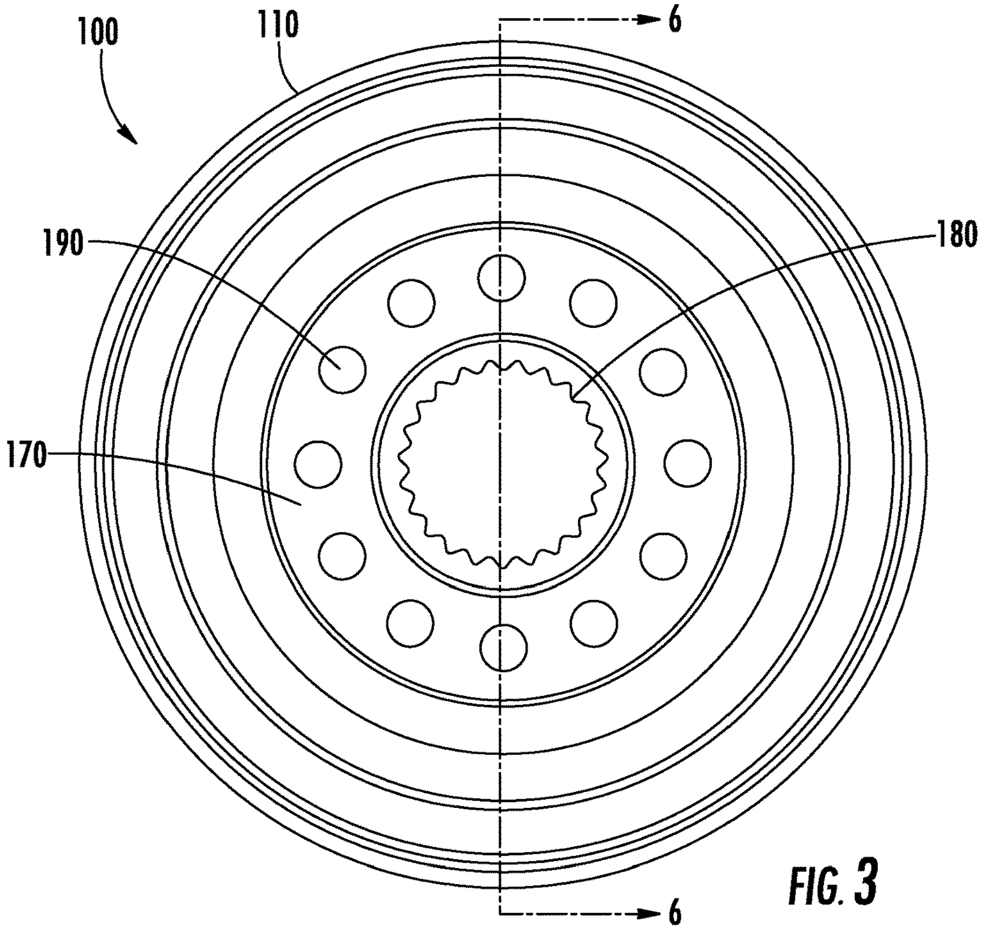
FIG. 3 is an end side view of a harmonic drive according to an embodiment.

FIG. 3 shows an end view of the drive 100 of FIG. 2. As in FIG. 2, rotational energy received by the wave generator 110 is transferred to the output shafts 180. As discussed more fully below, the output shaft 180 is surrounded by ground shafts including a first ground shaft 170 which are secured to a ground (i.e., immovable) location on a vehicle such as an aircraft with one or more mounting holes 190.

Figure 4:
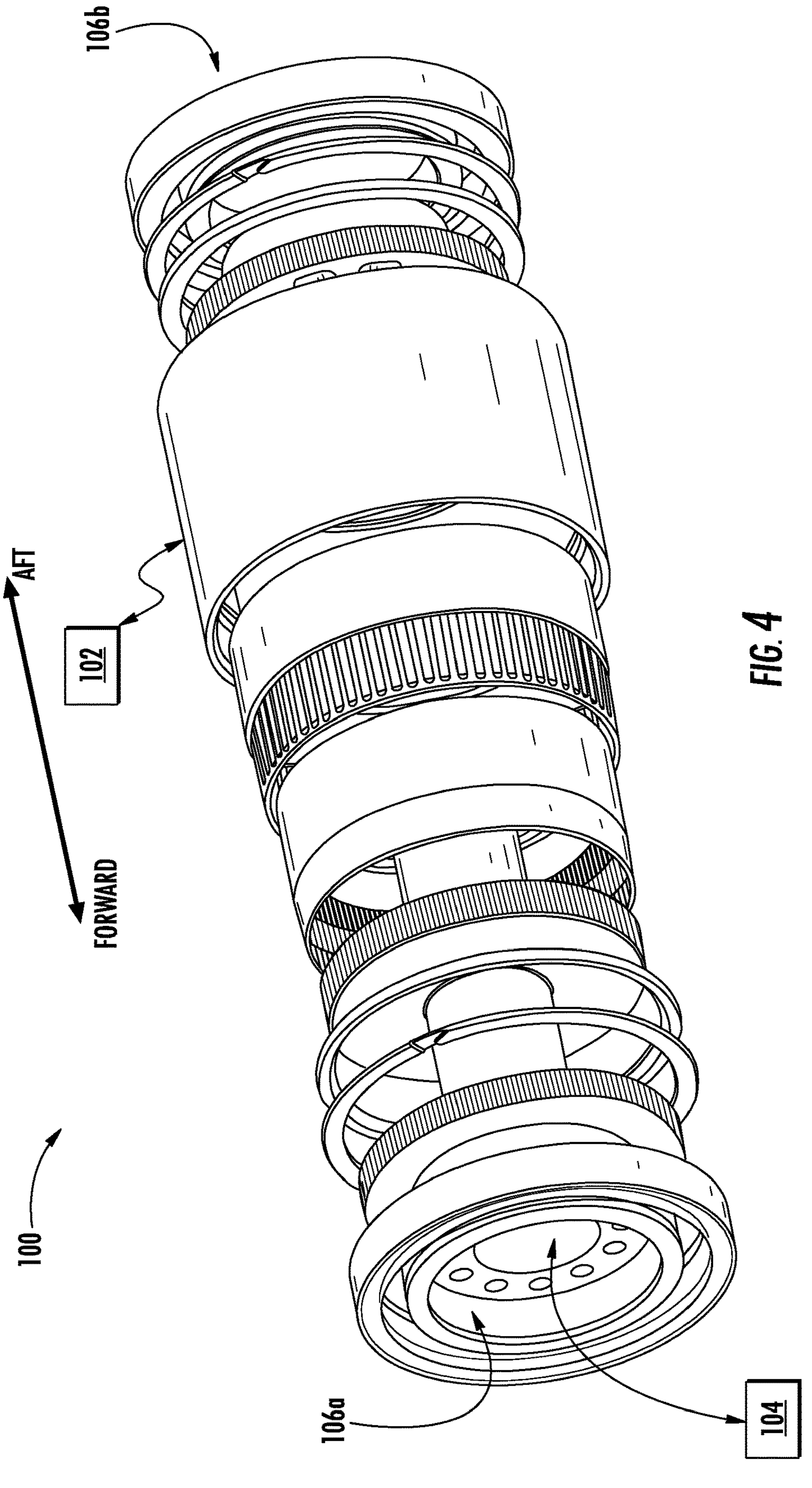
FIG. 4 is an exploded view of a harmonic drive according to an embodiment.

FIG. 4 is an exploded view of the drive 100. The drive 100 is balanced as will become apparent from this disclosure. The drive 100 may be used in an aircraft system, such as aircraft 10, for example to transfer energy between a first aircraft component 102, which may be a motor, and a second aircraft component 104 which may be a driven device such as an aerodynamic control surface. In FIG. 4 the first and second aircraft components 102, 104 are illustrated as boxes. The drive 100 may be attached at one or more opposing axial ends (generally referred to as 106 herein) to an aircraft support structure. The opposing axial ends 106 include a first axial end **106*a*, alternatively referred to as a forward end, and a second axial end 106*b***, alternatively referred to as an aft end.

Figures 5A, 5B:
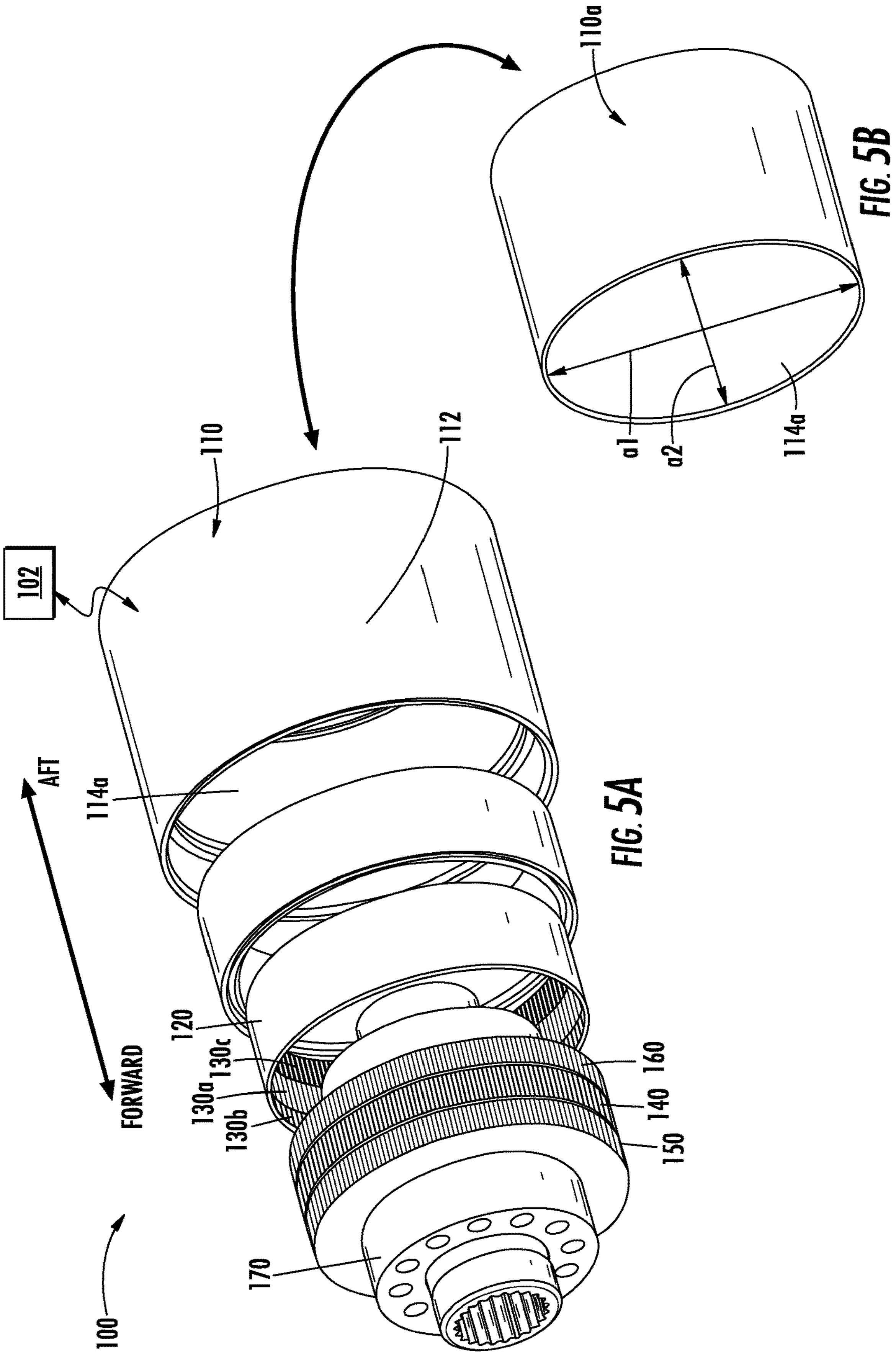
FIG. 5*a* is a partial assembly view of a harmonic drive according to an embodiment.
FIG. 5*b* is a perspective view of a wave generator of a harmonic drive according to an embodiment.

Turning to FIG. 5*a*, the drive 100 includes a wave generator 110, which includes a cylindrical outer surface 112 that receives rotational input from the first component 102. The wave generator 110 also includes an inner surface generally referred to as 114. In one embodiment an axial center portion **110*a* of the wave generator 110 has an inner surface 114*a* that is a lobed inner surface. In one embodiment the inner surface 114*a* is elliptical, for example having a first axis a1 that is larger than a second axis a2** (FIG. 5*b*). The wave generator generates a rotational wave output from the rotational input.

In one embodiment a bearing 220 is disposed radially within the wave generator 110. The bearing 220 conforms to the rotational wave shape defined by the wave generator 110.

A flex spline 120 is disposed radially within the bearing and wave generator 110. The flex spline 120 flexes as a result of the rotational wave generated by the wave generator 110, as discussed further below.

The flex spline 120 includes a plurality of inner facing splines 130 that include an axial center spline **130*a*. A first axial end spline 130*b* is adjacent to and forward of the axial center spline 130*a*. A second axial end spline 130*c* is adjacent to and aft of the axial center spline 130*a*. An output gear 140 is configured to mesh with the axial center spline 130*a*. A first ground gear 150 is adjacent to and forward of the output gear 140. The first ground gear 150 meshes with the first axial end spline 130*b*. A second ground gear 160 is adjacent to and aft of the output gear 140. The second ground gear 160 meshes with the second axial end spline 130*c***.

The splines 130 of the flex spline 120 mesh with the ground gears 150, 160 and the output gear 140 according to the flex spline inner surface profile. The first axial end spline **130*b* and the first ground gear 150 have a first gear ratio. The second axial end spline 130*c* and the second ground gear 160 have a second gear ratio that is the same as the first gear ratio. The axial center spline 130*a* and the output gear 140** have a third gear ratio that differs from the first and second gear ratios.

The different gear ratios combine to provide a differential motion between the ground gear 150, 160 and the output gear 140. Grounding gears 150, 160 provide motion of the output gear 140 at this differential motion and compound gear ratio. For example, the compound gear ratio may be identified as:

$$\text{Ratio } 1 = \frac{\text{Teeth in Axial Center Spline } (130a)}{\text{Teeth in Axial Center Spline } (130a) - \text{Teeth in } \mathit{Outpt} \text{ Gear } (140)}$$

$$\text{Ratio } 2 = \frac{\text{Teeth in Axial End Spline } (130b \text{ or } 130c)}{\text{Teeth in Axial End Spline } (130b \text{ or } 130c) - \text{Teeth in Ground Gear } (150 \text{ or } 160)}$$

Since the two axial end splines are connected the resulting gear ratio between ground gear splines outputs is the difference of the individual gear ratios:

$$\text{Compound Ratio} = \frac{1}{\frac{1}{\text{Ratio 1}} - \frac{1}{\text{Ratio 2}}}$$

Figure 6:
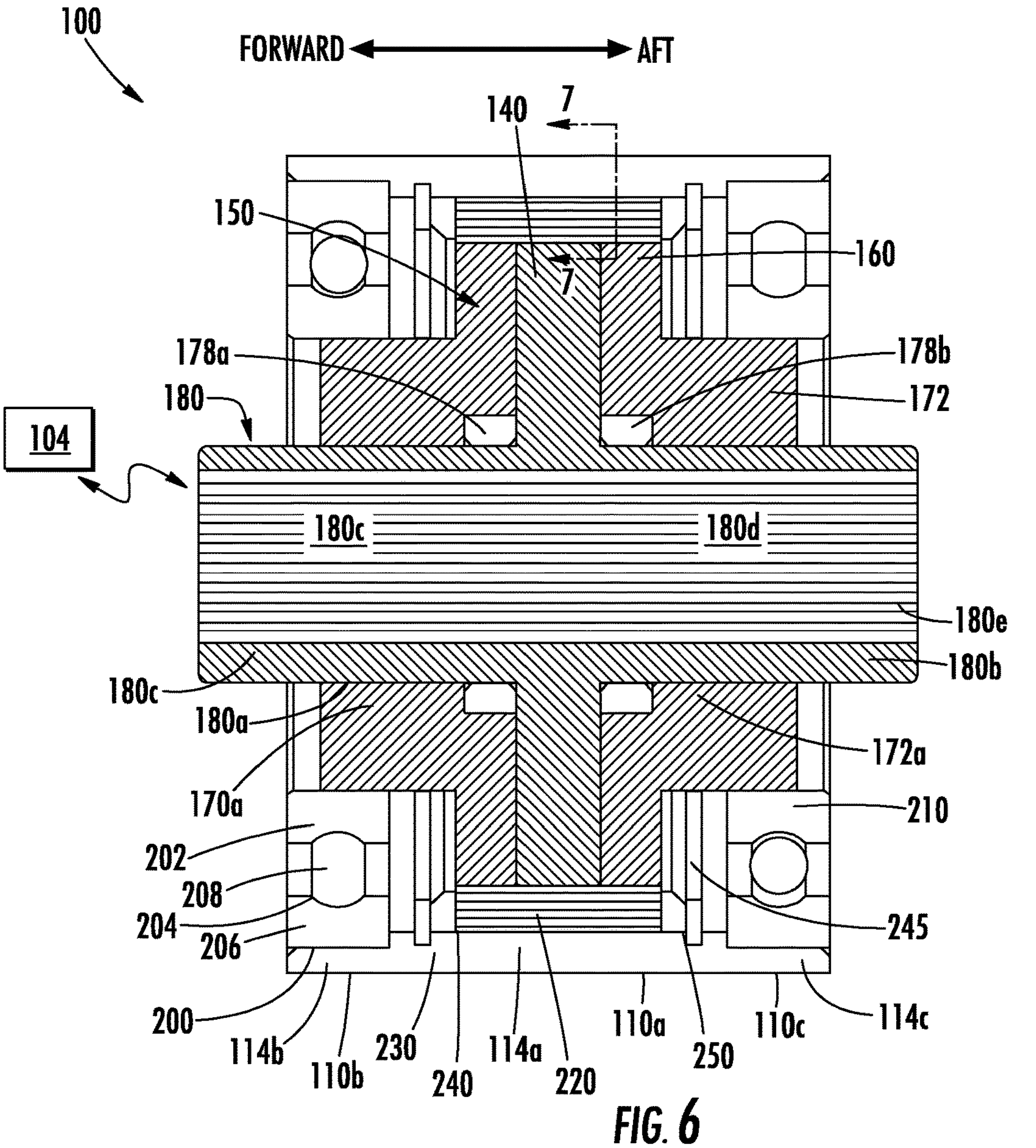
FIG. 6 is a cross sectional view, along lines 6-6 in FIG. 3, of a harmonic drive according to an embodiment.

Turning to FIG. 6, which represents a cross section along plane 6-6 illustrated in FIG. 3, the first ground gear 150 includes or is coupled to a first ground shaft 170 extending in the forward direction for mounting to the aircraft support structure. The second ground gear 160 includes a second ground shaft 172 extending in the aft direction for mounting with the aircraft support structure. The output gear 140 includes or is coupled to an output shaft 180. The output shaft 180 includes a first shaft portion 180*a* extending in the forward direction. In this embodiment, a second shaft portion 180*b* of the shaft 180 extends in the aft direction. In this embodiment, the output shaft 180 of the drive 100 extends forward and aft beyond the wave generator 110 (FIG. 2).

The disclosed embodiments, as indicated, provide a pair of ground gears 150, 160 with respective ground shafts 170, 172 that axially surround the output gear 140. This configuration provides a balanced distribution of torque about the output gear 140 and through the drive 100. As a result, the drive 100 is balanced, and the balanced gear supports a radial output without off-axis motion, and therefore prevents binding.

In one embodiment, the first shaft portion 180*a* includes a first passage 180*c* extending therethrough and the second shaft portion 180*b* includes a second passage 180*d* extending therethrough that is continuous with the first passage 180*c*. An output shaft spline 180*e* extends through the first passage 180*c* and the second passage 180*d* for connecting the drive 100 with the second aircraft component 104. That is, the drive 100 provides for connecting the second aircraft component 106 to one or both of the first shaft portion 180*a* and the second shaft portion 180*b*. Alternatively, the shaft 180 may be solid on one end and have the internal splines on the other end. Alternatively, the shaft 180 may be solid with exterior splines on either or both ends.

The first ground shaft 170 has a third passage 170*a* with a third passage diameter (not shown). The second ground shaft 172 has a fourth passage 172*a* with a fourth passage diameter that is the same as the third passage diameter. In various embodiments, the output shafts 180*a* and 180*b*, and the passages 170*a* and 170*b*, may have different diameters or the same diameter. The first shaft portion 180*a* of the output shaft 180 may extend through the third passage 170*a* in the first ground shaft 170. The second shaft portion 180*b* of the output shaft 180 may extend through the fourth passage 172*a* in the second ground shaft 172. Further, the first ground shaft 170 and the second ground shaft 172 of the drive 100 each include a plurality of the mounting holes 190 (FIG. 3).

In one embodiment, a pair of bearings 178, including a first bearing 178*a* and a second bearing 178*b*, are radially between the respective output shafts 180*a*, 180*b* and the respective ground shafts 170, 172. The bearings 178 provide support to the output shafts 180*a*, 180*b*. The bearings 178 may be plain, ball or roller bearings. In one embodiment, the inner surface of the respective ground gear shafts 170, 172 function as the bearings 178 obviating a need for the bearings 178 as separate structures. In one embodiment, the output shaft 180 does not extend completely though one or both axial sides of the drive 100. In such embodiments, the outer diameter of the output shaft 180 is supported by the bearing surfaces 178.

A first axial end bearing 200 is disposed radially between the first ground shaft 170 and an axial forward segment 110*b* of the wave generator 110, where an axial forward segment 114*b* of the inner surface 114 of the wave generator 110 is cylindrical. A second axial end bearing 210 is disposed between the second ground shaft 172 and an axial aft segment 110*c* of the wave generator 110, where an axial aft segment 114*c* of the inner surface 114 is cylindrical.

An axial center bearing 220 is disposed between the flex spline 120 and the axial center segment 110*a* of the wave generator 110 where the axial center segment 114*a* of the inner surface 114 is elliptical as indicated above. The center bearing 220 enables relative rotation between the wave generator 110 and the flex spline 120, and translates the rotational wave generated from the inner surface 114 of the wave generator 110 to harmonic input into the flex spline 120.

Figure 7:
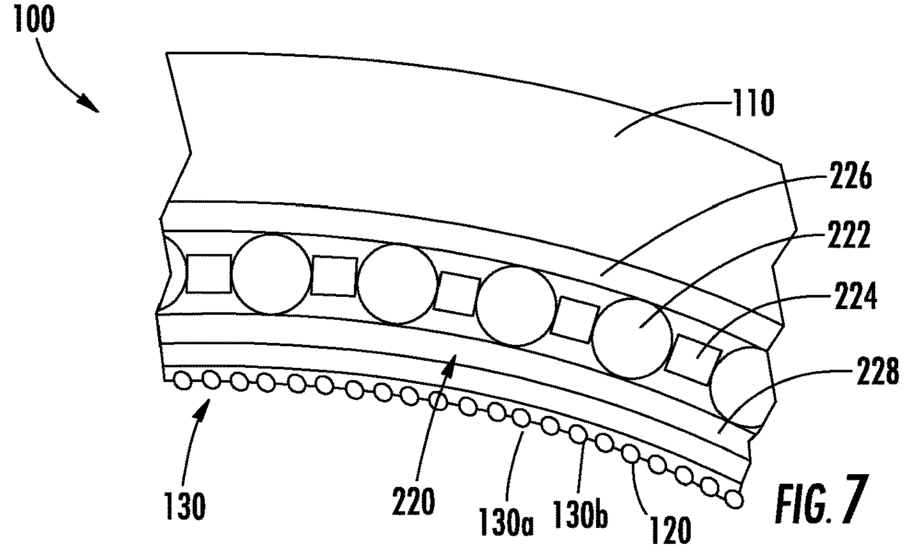
FIG. 7 is partial sectional view, along lines 7-7 in FIG. 6, of a harmonic drive according to an embodiment.

The first axial end bearing 200 and the second axial end bearing 210 are ball bearings, each with an inner race 202, an outer race 204 and a case 206 surrounding ball elements 208. In embodiments, the bearings may be rolling or plain bearings. The axial center bearing 220 is a roller bearing with rolling elements 222, bearing separator 224, an outer race 226 against the wave generator 110 and an inner race 228 against the flex spline 120 (FIG. 7).

A first retaining ring 230 is disposed between the first axial end bearing 200 and the axial center bearing 220 and against the first axial end bearing 200. A first thrust washer 240 is disposed between the first axial end bearing 200 and the axial center bearing 220 and against the axial center bearing 220. A second retaining ring 245 is disposed between the second axial end bearing 210 and the axial center bearing 220 and against the second axial end bearing 210. A second thrust washer 250 is disposed between the second axial end bearing 210 and the axial center bearing 220 and against the axial center bearing 220. The washers and thrust bearings prevent the flex spline 120 from unintended axial motion, that is, from walking axially. The inclusion of the regaining rings 230, 245 and thrust washers 245, 250 represent one embodiment and are not intended to limit a scope of the disclosed embodiments.

Figure 8:
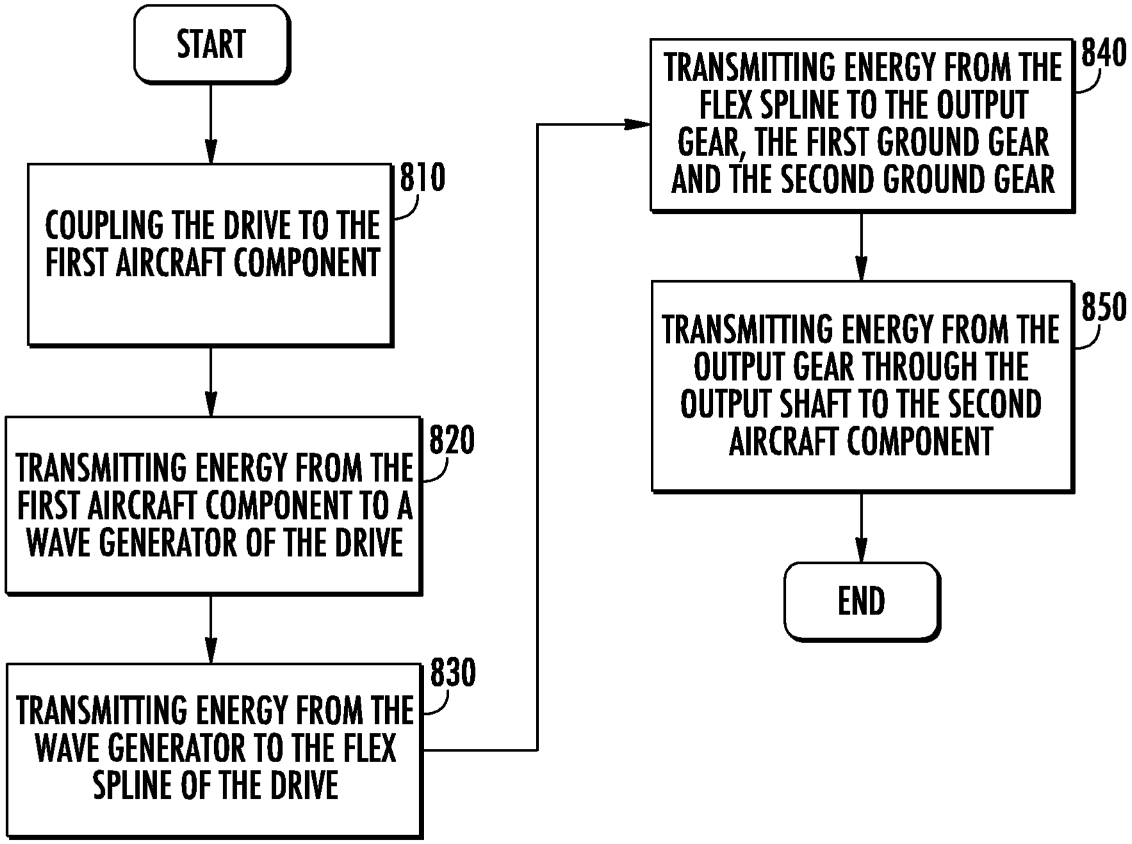
FIG. 8 is a flow chart of a process of transmitting energy in a balanced harmonic drive according to a disclosed embodiment.

Turning to FIG. 8, disclosed is a method of transmitting energy from the first aircraft component 102 to the second aircraft component 104. The method includes coupling the drive 100 to the first aircraft component 102, the second aircraft component 104, and the aircraft ground structure as indicated at block 810. As shown at block 820, the method further includes transmitting energy from the first aircraft component 102 to a wave generator 110 of the drive 100. As shown in block 830, the method further includes transmitting energy from the wave generator 110 to the flex spline 120 of the drive 100. As shown in block 840, the method further includes transmitting energy from the flex spline 120 to the output gear 140, the first ground gear 150 and the second ground gear 160. As shown in block 850, the method further includes transmitting energy from the output gear 140 through the output shaft 180 to the second aircraft component. As indicated, the gear ratio between the flex spline 120 and both ground gears 150, 160 is the same.

By the above disclosed method, energy is transferred to both ground gears 150, 160 to provide a balanced load distribution about the output gear 140. As result, as indicated, the drive 100 is balanced, and the balanced gear supports a radial output without off-axis motion, and therefore prevents binding.

The term “about” is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inverted compound harmonic drive comprising:

a wave generator configured to receive rotational input;

a flex spline disposed radially within the wave generator that receives energy due to the rotation of the wave generator, the flex spline including a plurality of inner facing splines that include an axial center spline, a first axial end spline being adjacent to and forward of the axial center spline, and a second axial end spline adjacent to and aft of the axial center spline;

an output gear meshes with the axial center spline;

a first ground gear adjacent to and forward of the output gear that meshes with the first axial end spline; and a second ground gear adjacent to an aft of the output gear that meshes with the second axial end spline;

wherein:

the first ground gear includes a first ground shaft extending in a forward direction;

the second ground gear includes a second ground shaft extending in an aft direction; and the output gear includes an output shaft, the output shaft including one or more of:

a first shaft portion extending in the forward direction with a first passage therethrough, the first passage being splined; and a second shaft portion extending in the aft direction with a second passage therethrough, the second passage being continuous with the first passage, second passage being splined.

2. The drive of claim 1, wherein:

the first axial end spline and the first ground gear have a first gear ratio;

the second axial end spline and the second ground gear have a second gear ratio that is the same as the first gear ratio; and the axial center spline and the output gear have a third gear ratio that differs from the first and second gear ratios.

3. The drive of claim 1, wherein:

the first ground shaft has a third passage therethrough with a third passage diameter;

the second ground shaft has a fourth passage therethrough with a fourth passage diameter;

the first shaft portion of the output shaft extends through the third passage; and the second shaft portion of the output shaft extends through the fourth passage.

4. The drive of claim 1, wherein the first ground shaft and the second ground shaft each include a plurality of mounting holes.

5. The drive of claim 1, further comprising:

a first axial end bearing disposed between the first ground shaft and the wave generator;

a second axial end bearing disposed between the second ground shaft and the wave generator; and an axial center bearing disposed between the flex spline and the wave generator.

6. The drive of claim 5, wherein:

the first axial end bearing and the second axial end bearing are roller bearings, ball bearings or a plain bearings; and the axial center bearing is a roller bearing, a ball bearing or a plain bearing.

7. The drive of claim 5, further comprising:

a first retaining ring disposed between the first axial end bearing and the axial center bearing and against the first axial end bearing;

a first thrust washer disposed between the first axial end bearing and the axial center bearing and against the axial center bearing;

a second retaining ring between the second axial end bearing and the axial center bearing and against the second axial end bearing; and a second thrust washer between the second axial end bearing and the axial center bearing and against the axial center bearing.

8. An aircraft system comprising:

an inverted compound harmonic drive that includes:

a wave generator receives rotational input from a first aircraft component;

a flex spline disposed radially within the wave generator that receives energy due to the rotation of the wave generator, the flex spline including a plurality of inner facing splines that include an axial center spline, a first axial end spline being adjacent to and forward of the axial center spline, and a second axial end spline being adjacent to and aft of the axial center spline;

an output gear meshes with the axial center spline;

a first ground gear is adjacent to and forward of the output gear and meshes with the first axial end spline; and a second ground gear is adjacent to and aft of the output gear and meshes with the second axial end spline, wherein:

the first ground gear includes a first ground shaft extending in a forward direction and connecting with aircraft ground structure;

the second ground gear includes a second ground shaft extending in an aft direction and connecting with aircraft ground structure; and the output gear includes an output shaft, the output shaft including one or more of, a first shaft portion extending in the forward direction with a first passage therethrough, the first passage being splined; and a second shaft portion extending in the aft direction with a second passage therethrough, the second passage being continuous with the first passage, first passage being splined;

wherein the output shaft is configured to connect with a second aircraft component.

9. The system of claim 8, wherein:

the first axial end spline and the first ground gear are configured with a first gear ratio; and the second axial end spline and the second ground gear are configured with a second gear ratio that is the same as the first gear ratio; and the axial center spline and the output gear are configured with a third gear ratio that differs from the first gear ratio.

10. The system of claim 8, wherein:

the first ground shaft has a third passage therethrough with a third passage diameter;

the second ground shaft has a fourth passage therethrough with a fourth passage diameter;

the first shaft portion of the output shaft extends through the third passage; and the second shaft portion of the output shaft extends through the fourth passage.

11. The system of claim 8, wherein the first ground shaft and the second ground shaft each include a plurality of mounting holes.

12. The system of claim 8, comprising:

a first axial end bearing disposed between the first ground shaft and the wave generator;

a second axial end bearing disposed between the second ground shaft and the wave generator; and an axial center bearing disposed between the flex spline and the wave generator.

13. The system of claim 12, wherein:

the first axial end bearing and the second axial end bearing are roller bearings, ball bearings or a plain bearings; and the axial center bearing is a roller bearing, a ball bearing or a plain bearing.

14. The system of claim 12, wherein:

a first retaining ring and a first thrust washer are disposed between the first axial end bearing and the axial center bearing, wherein the first retaining ring is against the first axial end bearing and the first thrust washer is against the axial center bearing; and a second retaining ring and a second thrust washer are disposed between the second axial end bearing and the axial center bearing, wherein the second retaining ring is against the second axial end bearing and the second thrust washer is against the axial center bearing.

15. A method of transmitting energy from a first component to a second component, comprising:

coupling an inverted compound harmonic drive to the first component, the second component, and a ground structure;

transmitting energy from the first component to a wave generator of the inverted compound harmonic drive;

transmitting energy from the wave generator to a flex spline of the inverted compound harmonic drive; and transmitting energy from the flex spline to:

an output gear that meshes with an axial center spline of the flex spline;

a first ground gear is adjacent to and forward of the output gear that meshes with a first axial end spline of the flex spline; and a second ground gear is adjacent to and forward of the output gear that meshes with a second axial end spline of the flex spline;

transmitting energy from the output gear through an output shaft to the second component;

securing a first ground shaft of the first ground gear that extends in a forward direction to a first structure; and securing a second ground shaft of the second ground gear that extends in an aft direction to a second structure;

and rotatably connecting the second component to one of:

a first output shaft portion of the output shaft extends in the forward direction through the first ground gear, wherein the first shaft portion extends in the forward direction with a first passage therethrough, the first passage being splined; and a second output shaft portion of the output shaft that extends in the aft direction through the second ground gear, wherein the second shaft portion extends in the aft direction with a second passage therethrough, the second passage being continuous with the first passage, the second passage being splined.

* * * * *